United States Patent

Howe, Jr.

[15] 3,693,226

[45] Sept. 26, 1972

[54] METHOD OF MAKING AN ANTIFRICTION BEARING RING

[72] Inventor: Ralph S. Howe, Jr., New Britain, Conn.

[73] Assignee: Textron, Inc., Providence, R.I.

[22] Filed: Jan. 7, 1971

[21] Appl. No.: 104,569

Related U.S. Application Data

[62] Division of Ser. No. 868,736, Oct. 23, 1969, Pat. No. 3,640,592.

[52] U.S. Cl. .................................29/148.4 R
[51] Int. Cl. .................................B21h 1/12
[58] Field of Search............29/148.4 R, 148.4 A, 149 .5NM 308/195, 193

[56] References Cited

UNITED STATES PATENTS

| | | |
|---|---|---|
| 2,376,779 | 5/1945 | Kendall.................29/148.4 R |
| 3,304,138 | 2/1967 | Sampatacos..............308/195 |

*Primary Examiner*—Thomas H. Eager
*Attorney*—Sandoe, Hopgood & Calimafde

[57] ABSTRACT

The invention contemplates a major economy in the metal required for manufacture of an antifriction bearing ring, such as the outer-race ring of a ball bearing, said economy being realized without loss of integrity of the race or its radial-load capability, as compared with a conventional all-metal race-ring construction of equivalent capacity. Economy is realized by forming an insert from a cylindrical annulus of a deformable and hardenable material, such as ductile steel, the deformation being to create a ring of substantially uniform thickness but continuously concaved, at one of the inner and outer surfaces, to define the raceway contour. The deformation is to an extent producing a concave surface of depth exceeding the desired ultimate raceway depth. The deformed ring is hardened and then embedded in a body molding of plastic or elastomeric material, depending on ultimate-use requirements. Race-finishing, including the step of removing excess insert metal to create the desired raceway depth, can proceed before or after molding.

12 Claims, 11 Drawing Figures

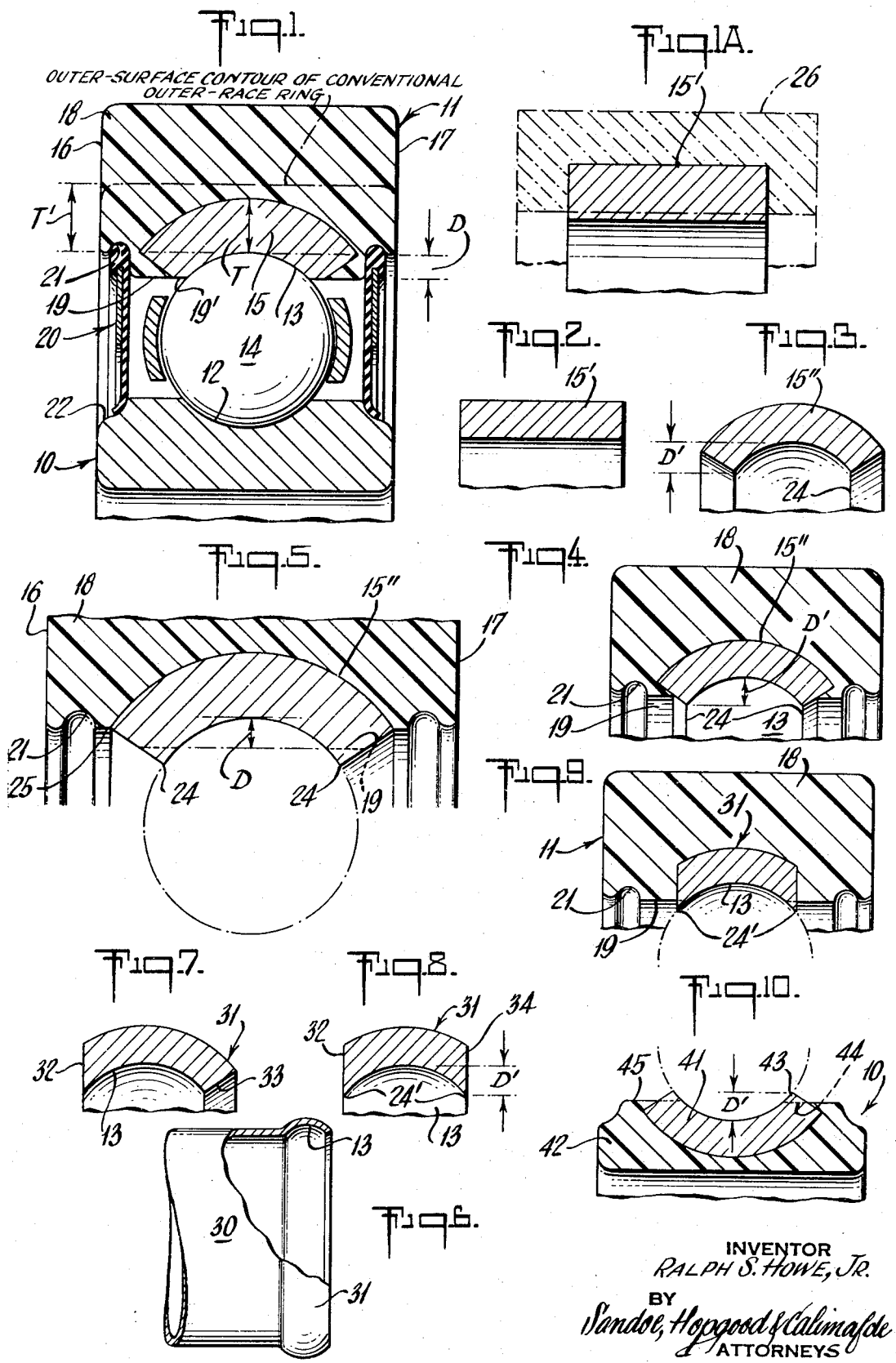

METHOD OF MAKING AN ANTIFRICTION BEARING RING

This application is a division of my copending application, Ser. No. 868,736, filed Oct. 23, 1969, now U.S. Pat. No. 3,640,592, patented Feb. 8, 1972.

This invention relates to antifriction bearings, and in particular to a bearing-ring construction and method.

The rising cost of steel and the need to economize in its use create significant pressures on the ball-bearing business, particularly in regard to the cost of bearing rings, and various proposals have been made to meet the problem. Unfortunately, however, such proposals as have involved the use of substitute materials create particular shortcomings, resulting for example in reduced load capacity for a given size; longevity, reliability, and tolerances also suffer.

It is, accordingly, an object of the invention to provide an improved bearing-ring construction and method, in large part meeting the stated problem.

A specific object is to provide an improved bearing ring and method wherein there may be at least a 50 percent saving in steel required without sacrificing the radial-load capacity of a given size antifriction bearing.

It is also a specific object to provide an improved construction for such special purpose bearing rings (such as an outer-bearing ring which is also a cam-follower roll) as require a bonded outer body of plastic, rubber or the like, whereby improved race support is achieved with reference to the bonded body material.

Another specific object is to provide a construction and method meeting the above objects and involving substantially less metal cutting than heretofore.

A still further specific object is to achieve the foregoing objects even for configurations involving relatively deep race grooves.

Other object and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is an enlarged fragmentary vertical sectional view of an assembled antifriction bearing in which the invention is incorporated in the outer race ring;

FIG. 1A is a sectional layout, to the same scale and from the same aspect as in FIG. 1, for comparative illustration of the metal required for carrying out the invention, in the context of the metal requirement for a conventional all-metal outer bearing ring of the same race dimensions;

FIGS. 2, 3 and 4 are sectional views on a lesser scale to illustrate steps according to one embodiment of the inventive method;

FIG. 5 is an enlarged vertical sectional view of a modified bearing ring in accordance with the invention;

FIGS. 6, 7, 8 and 9 are sectional views on a reduced scale to illustrate another embodiment of the inventive method; and FIG. 10 is a sectional view to illustrate application of the invention to an inner race ring.

Briefly stated, the invention contemplates a major economy in the metal required for manufacture of an anti-friction bearing ring, such as the outer-race ring of a ball bearing, said economy being realized without loss of integrity of the race or its radial-load capability, as compared with a conventional all-metal race-ring construction of equivalent capacity. Economy is realized by forming an insert from a cylindrical annulus of a deformable and hardenable material, such as ductile steel, the deformation being to create a ring of substantially uniform thickness but continuously concaved, at one of the inner and outer surfaces, to define the raceway contour. The deformation is to an extent producing a concave surface of depth exceeding the desired ultimate raceway depth. The deformed ring is hardened and then embedded in a body molding of plastic or elastomeric material, depending on ultimate-use requirements. Race-finishing, including the step of removing excess insert metal to create the desired raceway depth, can proceed before or after molding.

Referring to FIG. 1 of the drawings, the invention is shown in application to a ball bearing comprising inner and outer rings 10–11, having opposed concave raceways 12–13 accommodating a complement of balls 14. The inner ring 10 is shown as of conventional all-metal construction, and the method of the invention is shown in application to the outer ring 11.

According to the invention, a hardened insert 15 defines the outer race and provides substantially uniform body thickness, for sustaining radial loads via balls 14; the remainder of the body of outer ring 11 is of less costly molded material, in which the insert 15 is substantially entirely embedded, except for the exposed raceway surface 13. Thus, the insert 15 is embedded between integral axially projecting end regions 16–17 of the plastic body 18; stated in other words, the insert 15 is embedded in and between axial ends of the bore or inner surface 19 of the outer ring 11, being ground off at 19' to define an axially extensive surface contiguous with and matching the bore 19. A so-called "pop-in" seal is shown fitted in a seal groove 21 which may be formed, upon molding, in one or both projecting axial ends 16–17. The seal 25 is shown to have light, resiliently loaded, axially wiping contact with a suitably concaved seal surface or recess 22 at the corresponding axial end of inner ring 10.

According to the technique illustrated by FIGS. 2, 3 and 4, the outer ring 11 is made by first selecting a cylindrical annulus 15' of deformable and hardenable metal (FIG. 2), such as a suitable ductile steel. The annulus is then subjected to deformation, while maintaining substantially uniform radial thickness, to define a concave inner surface of substantially desired race curvature, as shown for the deformed annulus 15" of FIG. 3; in carrying out this step, the concave depth D' is deliberately made in excess of the ultimate raceway depth D (see FIG. 1). Next, the insert 15" is hardened to the desired extent and may be otherwise finished, as by race-grinding and polishing, and by grinding off shoulders 24 to create the desired raceway depth D; however, I prefer and illustrate such finishing steps after molding body 18 to the insert 15". In FIG. 4, the body 18 is shown to have been molded to all desired ultimate contours, i.e., as to finished outer surface end surface and inner surface detail, including, as desired, the seal-mounting formation 21. The only remaining steps are those of finish-grinding and polishing the race 13, and, if desired, machining off shoulders 24 to provide the desired raceway depth D; as shown in FIG. 1, grinding of shoulders 24 results in a smooth continuous bore 19-19', to the point of intersection with the finished race surface. Alternatively, the shoulders 24 may be machined off prior to hardening.

FIG. 5 illustrates a modification wherein the molding step provides the molded body bore 25 at the corner (or axial-end) circle of the deformed, hardened ring insert 15'', and the shoulders 24 are ground off to the same surface 19' as previously described, thus again providing the desired raceway depth D. The modification of FIG. 5 will be seen to present what may be simpler molding conditions, in that molding material is not forced around the axially outer corners of insert 15''. At the same time, an adequate shoulder is retained adjacent groove 21, for secure seal seating and retention.

Returning to FIG. 1, the described technique will be seen to provide a bearing-race ring 11 in which the body thickness T at maximum race-groove depth is substantially the magnitude T' applicable to a conventional all-metal outer ring, the outer profile of which is indicated by a phantom line and by legend in FIG. 1. All outer-ring body profiles of the conventional metal ring are retained, except for the outer diameter; even though this may mean a larger outer diameter for a given bearing size, the departure does not critically affect end-use requirements for a large number of applications, as where the outer surface of the outer ring 11 is a cam roll or the like. The saving in bearing metal is dramatized in FIG. 1A, wherein the undeformed cylindrical blank 15' is sectioned, to the scale applicable for forming insert 15 of FIG. 1; for contrast, the phantom outline 26 (for which the metal thickness is shown in lightly phantomed cross-hatching, indicates the much greater initial blank required to form a conventional all-metal outer ring to the outer-surface contour indicated by legend in FIG. 1. The saving is seen to exceed 50 percent, and the economies of metal-cutting are in the same order to magnitude.

FIGS. 6 to 9 illustrate an alternative method, in which an elongated tube 30 of deformable and hardenable material is employed in place of the ring blank 15'. FIG. 6 shows the race-contouring deformation 31 at one axial end of tube 30, the inner race surface 13 being thereby generated in the bore at end 31. In the next step (FIG. 7), the deformed end 31 has been cut off from tube 30, leaving unmatched axial ends 32-33 which reflect the different manners in which they were produced. The thus-deformed insert ring 31 may then be hardened, so that a radial end face 34 may be ground in place of the sloping end 33; alternatively, the end face 34 may be generated prior to cut-off of ring 31, as will be understood. In either event, prior to molding, the ring 31 may have the appearance of FIG. 8, wherein race shoulders 24' will be understood to define a race depth D' exceeding the ultimately desired depth D. Thus, upon molding or embedding in the body 18, the article will have the appearance of FIG. 9, with shoulders 24' projecting inwardly of the body bore 19; the part may be finished by race-grinding, and by grinding off shoulders 24' to the desired diameter 19.

FIG. 10 illustrates application of the invention to production of an inner race ring 40, in which a concaved hardened and finished race insert 41 is embedded in a molded body 42. The deformation of ring insert 41 (as with insert 15'', of FIGS. 3 and 4) is to a race depth D' exceeding the ultimate desired depth, and after molding and other finishing operations, the projecting shoulders 43 are ground-off to produce the desired race-groove depth, as suggested at 44, to coincide with the molded outer cylindrical surface 45.

It will be seen that the invention provides substantial economies of metal in the formation of bearing rings of the character indicated. Important economies are also achieved by reducing the number and character of machining operations, which are essentially reduced to roll-forming (deforming to create the convex race contour) and to grinding or the like finishing operations. In other words, there are no critical lathe or the like operations. At the same time, the resultant product can meet a substantial fraction of the demand for bearings of a given size and load capacity, the only sacrifice being the provision of a slightly enlarged overall radial thickness of the race ring (with molded insert).

By deforming the insert ring to a concave depth exceeding ultimate raceway depth (and thereafter grinding off the shoulders to desired raceway depth), there is assurance of finest quality and consistency throughout the entire ultimate raceway. Moreover, depending upon the technique used for ball assembly, the inventive method imposes no unusual limitations on ball complement or filling technique, and maximum-depth shoulders may be provided. The molding material may be of plastic (e.g., nylon, Nylatron, vinyl, etc.) or of elastomeric material, depending on use requirements; and the high quality bond which is inherently achieved by the "keystone" section shape of the insert 15'' may be further enhanced by application of an adhesive or primer coat to the insert 15'' prior to molding.

While the invention has been described in detail for the preferred forms and methods illustrated, it will be understood that modifications can be made without departure from the scope of the invention.

What is claimed is:

1. The method of making an antifriction bearing ring, which comprises selecting a cylindrical annulus of deformable and hardenable race material, deforming said annulus to desired race curvature at one of the inner and outer surfaces of said annulus to produce a concave race curve of radial depth exceeding that required in the finished bearing, hardening the deformed annulus, molding the deformed annulus to a ring of moldable material with said one surface being exposed for finishing, and then removing annulus material at the exposed axial ends of said annulus to reduce the race curve to desired depth.

2. The method of claim 1, in which the desired race contour is provided at the radially inner surface of said annulus and the substantial bulk of the molded material circumferentially surrounds the annulus.

3. The method of claim 1, in which the annulus is embedded in molded material substantially completely except for the exposed surface, whereby molded material overlaps and extends beyond both axial ends of the annulus.

4. The method of claim 2, in which at least one of the molded axial ends is contoured with a seal-receiving contour in the molding step.

5. The method of claim 1, in which the desired race contour is provided at the radially outer surface of said annulus and the annulus circumferentially surrounds the substantial bulk of the molded material.

6. The method of claim 1, in which, prior to deformation, the annulus is the entire piece to be deformed to make one race, being axially shorter than its radius.

7. The method of claim 1, in which, prior to deformation, the annulus is an elongated tube, in which the deformation step is performed at an axial end of the tube, and in which the deformed end is cut off prior to hardening and finishing.

8. The method of claim 3, in which the radial extent of molded-material overlap with the annulus is beyond the maximum depth of the race surface.

9. The method of claim 1, in which the radial thickness of said annulus is substantially the extent of a conventional all-metal bearing-ring body thickness at the section of maximum race depth, whereby the finished annulus provides antifriction-element support which is substantially that provided by a conventional all-metal bearing of equivalent size and antifriction-element complement.

10. The method of claim 1, in which the moldable material is a plastic.

11. The method of claim 1, in which the moldable material is elastomeric.

12. The method of claim 1, in which the race is finish-ground after the molding step.

* * * * *